United States Patent [19]

Vander Schaaf

[11] E Patent Number: Re. 32,933

[45] Reissued Date of Patent: May 30, 1989

[54] ENVIRONMENTAL TEST CHAMBER

[75] Inventor: Donald Vander Schaaf, Holland, Mich.

[73] Assignee: Venturedyne, Ltd., Milwaukee, Wis.

[21] Appl. No.: 158,879

[22] Filed: Feb. 22, 1988

Related U.S. Patent Documents

Reissue of:

[64] Patent No.: 4,572,283
Issued: Feb. 25, 1986
Appl. No.: 646,699
Filed: Aug. 31, 1984

[51] Int. Cl.[4] ..... F25B 29/00

[52] U.S. Cl. ..... 165/61; 62/159

[58] Field of Search ..... 165/61, 65, 21, 30, 165/101, 103, 60; 62/325, 159

[56] References Cited

U.S. PATENT DOCUMENTS

| | | | |
|---|---|---|---|
| 1,895,876 | 1/1933 | Bennett et al. | 165/61 |
| 2,091,562 | 8/1937 | Palmer | 165/21 X |
| 2,718,119 | 9/1955 | Prince | 62/159 |
| 2,739,794 | 3/1956 | Graham | 165/61 X |
| 3,424,231 | 1/1969 | Truhan | 165/60 X |
| 3,635,245 | 1/1972 | Canfield | 165/103 X |
| 3,765,478 | 10/1973 | Whalen | 165/101 X |
| 4,106,552 | 8/1978 | Hufford | 165/61 X |

FOREIGN PATENT DOCUMENTS

| | | |
|---|---|---|
| 1823550 | 10/1960 | Fed. Rep. of Germany . |
| 2420644 | 12/1974 | Fed. Rep. of Germany . |
| 2650686 | 6/1979 | Fed. Rep. of Germany . |
| 7932377 | 11/1980 | Fed. Rep. of Germany . |

*Primary Examiner*—Lloyd L. King
*Attorney, Agent, or Firm*—Michael, Best & Friedrich

[57] ABSTRACT

A test chamber device comprising a generally enclosed chamber a first duct communicating with the chamber and including therein selectively operable heating coils, a second duct communicating with the chamber and including therein selectively operable refrigerating coils, and a damper for closing the second duct when the heating coils are operating so that the refrigerating coils are isolated from air flow in the chamber.

28 Claims, 1 Drawing Sheet

ENVIRONMENTAL TEST CHAMBER

Matter enclosed in heavy brackets [ ] appears in the original patent but forms no part of this reissue specification; matter printed in italics indicates the additions made by reissue.

BACKGROUND OF THE INVENTION

The invention relates to test chambers for subjecting an object to varying environmental conditions, such as varying temperature and humidity. More particularly, the invention relates to the circulation of conditioned air in such test chambers.

In prior test chambers, a heater in the circulation system is used to heat the air and a refrigeration coil in the system is used to cool the air. If the refrigeration coil remains in the path of air circulation when hot air is being circulated, the heated air picks up moisture from frost and ice on the refrigeration coil. Since the object being tested is at a lower temperature than the moisture containing heated air, undesirable condensation on the object will result as the heated air passes over it.

Another problem with prior test chambers is the time lag between shifting from a hot condition to a cold condition, and vice versa. This occurs because it is often necessary to heat or cool the entire test chamber before the temperature of the object being tested is sufficiently changed. Accordingly, a great deal of time is wasted.

SUMMARY OF THE INVENTION

The invention provides a test chamber device comprising a generally enclosed chamber, and a system for alternatively circulating hot and cold air in the chamber. The circulating system includes alternatively operable heating means and refrigerating means, and means for isolating the refrigerating means from the circulation system when the heating means is operating. Preferably, the heating means includes heating coils and the refrigerating means includes refrigeration coils, with both sets of coils exposed to air circulating in the system.

In the preferred embodiment, the circulating means further includes conduit means having opposite first and second ends adapted to communicate with the chamber. A fan associated with the conduit means causes the flow of air into the chamber. The heating and refrigeration coils are within the conduit means. Preferably, the conduit means includes a first duct associated with the heating coils and a second duct associated with the refrigeration coils. The conduit means further includes means for selectively connecting the first duct to the second duct when the refrigerating coils are operating, so that cool air is directed into the chamber, and for selectively isolating the refrigerating means from the chamber when the heating coils are operating, so that the refrigeration coils are out of the air circulating system when heated air is being delivered to the chamber.

In the preferred embodiment, a damper is provided in the circulating system to alternatively expose the refrigeration coils to the circulating air during the cooling cycle and isolate the refrigeration coils from the circulating air during the heating cycle. Also, in the preferred embodiment, the conduit means in which the refrigeration coils are exposed to the air is generally vertically oriented and includes means for draining water dripping from the refrigeration coils.

Preferably, the first duct communicates with the chamber through an opening in which the fan is positioned, and the device further includes a flexible boot registering with the fan and extending into the chamber for directing the air from the first duct onto an object in the chamber. The chamber is adapted to have the object positioned beneath the boot.

A principal feature of the invention is the provision of means for isolating the refrigerating means from the air flow when the heating means is operating. This prevents condensation on the object being tested, since the heated air does not pass over the refrigerating means and cannot pick up moisture from the refrigeration coils.

Another principal feature of the invention is the provision of a boot for directing the air from the first duct onto the object. This reduces the time lag when shifting temperature conditions since the conditioned air is directed onto the object and it is not necessary to heat or cool the entire test chamber in order to heat or cool the object.

Other features and advantages of the invention will become apparent to those skilled in the art upon review of the following detailed description, claims, and drawings.

Figure 1:
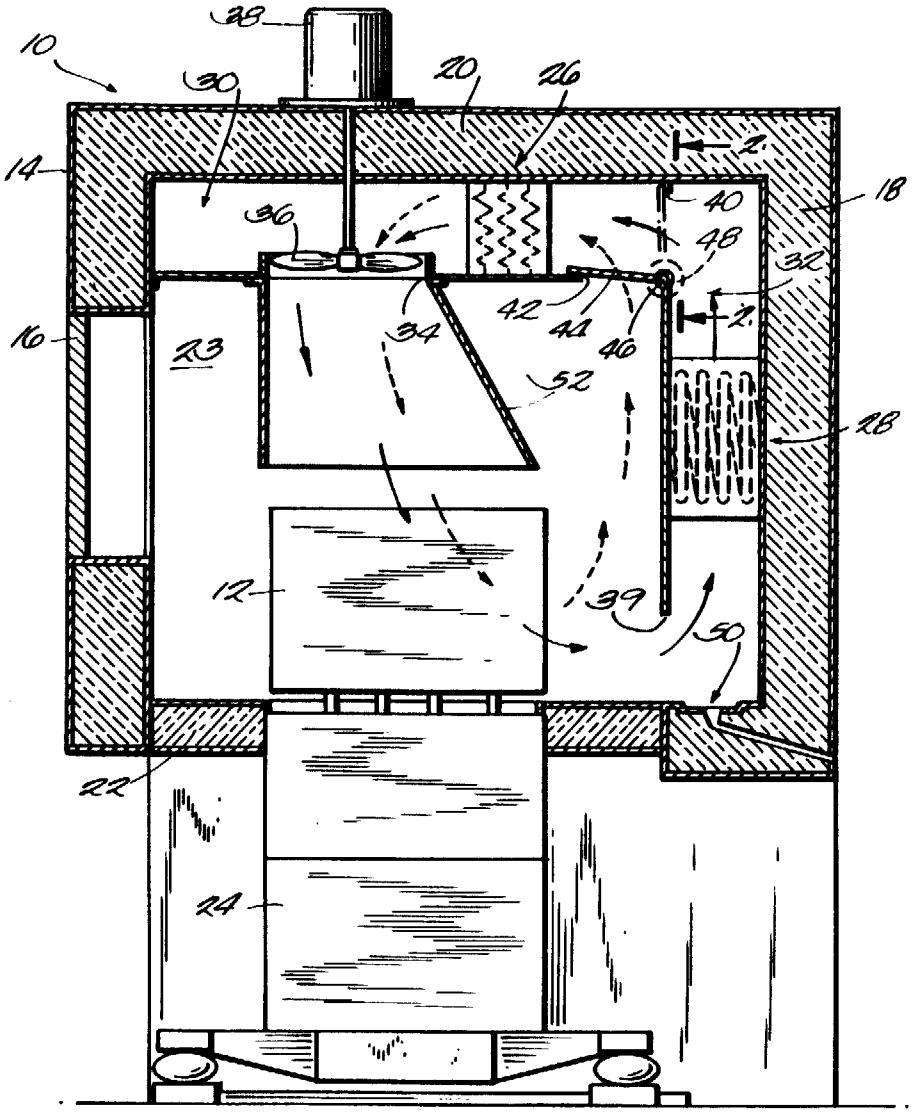
FIG. 1 is a cross-sectional view of a test chamber embodying the invention.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Referring to FIG. 1, a test chamber device 10 for subjecting an object 12 to varying temperature conditions is illustrated. The device 10 includes a front wall 14 having a door 16, a rear wall 18 opposite the front wall 14, a top wall 20, and a bottom wall 22 defining a test chamber 23. The device 10 is adapted to have the object 12 placed in the bottom of the test chamber 23. In the illustrated construction, the object 12 is supported by a shaker 24 extending through the bottom wall 22 of the device 10 for shaking the object 12. While such shaking means is not part of the invention, it should be understood that such a shaking means can be included in a device embodying the invention.

The device 10 also includes means for alternatively circulating hot and cold air in the chamber 23. In the preferred embodiment, such means includes alternatively operable heating means 26 and refrigerating means 28, and means for isolating the refrigerating means 28 when the heating means 26 is operating. Isolating the refrigerating means 28 prevents condensation collected on the refrigeration means from being transferred to the object 12, since the heated air does not pass over the refrigerating means 28.

While various suitable means can be employed for isolating the refrigerating means, in the preferred embodiment, the means includes a generally horizontal first duct 30 having the heating means 26 therein, and a generally vertical second duct 32 having the refrigerating means 28 therein. The first duct 30 runs along the top wall 20 of the device 10 and has a first or left end communicating with the chamber 23, and a second or right end opposite the first end. The first or left end of the first duct 30 includes an opening 34 communicating with the chamber 23. A fan 36 draws air through the first duct 30 and directs it through the opening 34 into the chamber 23. The fan 36 is powered by a motor 38. The second duct 32 runs along the rear wall 18 of the device 10 and has a first or upper end positioned adjacent the second or right end of the first duct 30, and a second or lower end near the bottom of the chamber 23 and communicating with the chamber 23 through an opening 39.

The device 10 also includes means for selectively connecting the second or right end of the first duct 30 to the first or upper end of the second duct 32 when the refrigerating means 28 is operating and for selectively isolating the refrigerating means 28 from the first duct when it is not. This includes means for opening the second or right end of the first duct 30 to the chamber 23 while closing the first or upper end of the second duct 32 when the heating means 26 is operating and the refrigeration means 28 is not.

In the preferred embodiment, the heating means 26 is of conventional construction and includes heating coils in duct 30, Similarly, the refrigerating means 28 is of conventional construction and includes refrigeration coils in duct 32.

In the illustrated construction, the second or right end of the first duct 30 has a first opening 40 communicating with the first or upper end of the second duct 32, and a second opening 42 communicating with the chamber 23. The means for connecting the second end of the first duct 30 to the first end of the second duct 32 includes a damper 44. The damper 44 is mounted on a generally horizontal shaft 46 which is rotatably mounted within the second duct 32. The damper 44 is selectively and alternatively movable between a first or generally horizontal position (shown in solid lines in FIG. 1) wherein the damper 44 opens the first opening 40 and closes the second opening 42, so that the second duct 32 communicates with the first duct 30, and a second or generally vertical position(shown in phantom in FIG. 1) wherein the damper 44 opens the second opening 42 and closes the first opening 40, so that air will circulate only through the first duct 30 and not through the second duct 32.

Figure 2:
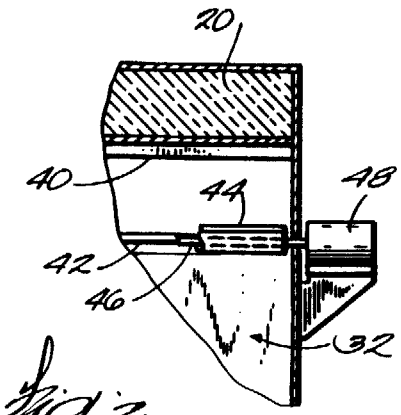
FIG. 2 is a cross-sectional view taken along line 2—2 in FIG. 1.

As best shown in FIG. 2, the device 10 includes a motor 48 operably connected to the damper shaft 46 for moving the damper 44 between the first and second positions. The motor 48 can be controlled by any suitable control means, and such control means would preferably be part of the means (not shown) for controlling overall operation of the device 10.

If the preferred embodiment, the device 10 further includes a drain 50 in the second or bottom end of the second duct 32 for draining water condensed on the refrigeration coils.

The device 10 further comprises, in the preferred embodiment, a flexible boot 52 registering with the opening 34 in the first or left end of the first duct 30 and extending downwardly into the chamber 23 for directing the air from the first duct 30 onto the object 12. The boot 52 reduces the time lag in shifting temperature conditions, since the air from the first duct 30 is directed onto the object 12, and it is not necessary to heat or cool the entire chamber 23 in order the heat or cool the object 12.

In operation and assuming the test device 10 is in a test mode where cold, refrigerated air is being circulated over the object 12, the damper 44 will be in the solid line position illustrated in FIG. 1. A continuous airflow conduit is then defined through ducts 30 and 32. Air is drawn into that continuous conduit by fan 36 with the air circulating through the conduit over the object 12 and returning to the conduit through the lower opening 39 in the duct 32. Both the refrigeration coils 28 and the heating coils 26, which are not energized, are in that airflow circuit.

When it is desired to subject the object 12 to hot air, the refrigeration coils 28 are turned off and the heating coils 26 are turned on. Also, the damper 44 is rotated to assume the dotted line position in FIG. 1. With the damper 44 in that position, the duct 32 is removed from the air circulation system, i.e., isolated from the airflow circuit. The air circulated in the test chamber 23 by fan 36 now follows a path through the boot 52 over the object 12 and returns to the air circulation conduit through opening 42 and passes only over the heating coils 26.

By isolating the refrigeration coils 28 from the air circulation flow, several advantages are obtained. During the cold air or refrigeration cycle, moisture will condense and freeze on the coils 28 in a well known manner. If the refrigeration coils 28 are left in the airflow circulation system when the heating coils 26 are energized, the hot air flowing over the coils will melt any frozen condensation and the hot air will then absorb moisture from the coils. That moisture laden air will flow through the conduit and onto the object 12. In the heating cycle, the object 12 will be at a temperature blow the heating air until it is brought up to temperature. Since it is cooler than the moisture laden air, the moisture in that air will tend to condense out on the object 12. This is an extremely undesirable result in a test procedure. By isolating the refrigeration coils 28 from the air circulation system, the hot air does not make circulation contact with the refrigeration coils 28 and cannot pick up the moisture from the coils 28, and in that respect the device 10 keeps the test sample relatively moisture free.

Another advantage from the disclosed preferred embodiment resides in the fact that the duct 32, although isolated from the airflow circuit, still has open communication with the interior of the test chamber 23 through the lower opening 39. The significance of this arrangement is that the refrigeration coils 28 will be the coldest spot in the overall test chamber 23. Any moisture which may be contained in the test chamber air tends to migrate to the coldest spot available. That coldest spot available being the refrigeration coils 28, the moisture will migrate from the circulating air through opening 39 to the coils 28 and condense out on the coils 28. This further contributes to keeping the object 12 generally moisture-free during the hot cycle portion of the test procedure.

As a result of the isolation of the refrigeration coils 28 and the face that on the hot cycle the refrigeration coils 28 will act in the nature of a dehumidifier, it is not necessary to include costly mechanisms such as air purge systems to change the air in the test chamber 23 each time the device 10 changes from a hot to cold cycle or vice versa. Such purge systems are expensive and also require time between test cycles thereby lengthening the overall test procedure. These problems and disadvantages are obviated by the preferred embodiment.

The drain 50 provides a ready and convenient means for conveying any condensation collected on the coils 28 and/or melted during the heating cycle out of the test chamber 23.

Various other features of the invention are set forth in the following claims.

I claim:

1. A test chamber device comprising a generally enclosed chamber, and means for circulating and alternatively heating and cooling the air in said chamber, said means including alternatively operable heating means and refrigerating means, a first duct having said heating means therein and including a first end communicating with said chamber, and a second end, a second duct having said refrigerating means therein and including a first end, and a second end communicating with said chamber, and means for selectively connecting said second end of said first duct to said first end of said second duct when said refrigerating means is operating, and for selectively isolating said refrigerating means when said heating means is operating by opening said second end of said first duct to said chamber and closing said first end of said second duct.

2. A test chamber device as set forth in claim 1 wherein said second end of said first duct has a first opening communicating with said first end of said second duct and a second opening communicating with said chamber, and wherein said means for connecting said second end of said first duct to said first end of said second duct includes a damper selectively and alternatively operable between a first position wherein said damper opens said first opening and closes said second opening, and a second position wherein said damper opens said second opening and closes said first opening, with said second end of said second duct remaining in communication with said chamber.

3. A test chamber device as set forth in claim 1 wherein said second duct is generally vertically oriented with said second end being the lower end, and wherein said device further includes means in said second end for draining water condensed on said refrigerating means.

4. A test chamber device as set forth in claim 1 wherein said first end of said first duct communicates with said chamber through a third opening having said fan therein, and wherein said device further comprises a boot registering with said third opening and extending into said chamber for directing the air from said first duct onto an object within said chamber.

5. A test chamber device as set forth in claim 4 wherein said third opening is downwardly facing, wherein said boot extends downwardly into said chamber, and wherein said chamber is adapted to have the object positioned beneath said boot.

6. A test chamber device comprising a generally enclosed chamber, a first duct having therein selectively operable heating means and including a first end communicating with said chamber, and a second end, a second duct having therein selectively operable refrigerating means and including a first end, and a second end communicating with said chamber, said second end of said first duct having a first opening communicating with said first end of said second duct and a second opening communicating with said chamber, and means for connecting said second end of said first duct to said first end of said second duct when said refrigerating means is operating, and for opening said second end of said first duct to said chamber and closing said first end of said second duct when said heating means is operating, said means including a damper selectively and alternatively operable between a first position wherein said damper opens said first opening and closes said second opening, and a second position wherein said damper opens said first opening and closes said second opening.

7. A test chamber device as set forth in claim 4 wherein said means for circulating the air further includes a fan positioned in said third opening in said first end of said first duct for blowing air from said first end of said first duct into said chamber.

8. A test chamber device as set forth in claim 1 wherein said means for circulating the air further includes a fan positioned in said first end of said first duct for blowing air from said first end of said first duct into said chamber.

9. A test chamber device comprising a generally enclosed chamber, a first duct having a first end communicating with said chamber and a second end including a first opening, and a second opening communicating with said chamber, a second duct extending generally vertically and having an upper end communicating with said first opening and a lower end communicating with said chamber, alternatively operable heating means and refrigerating means, said heating means being located in said first duct and said refrigerating means being located in said second duct, means in said lower end of second duct for draining water condensed on said refrigerating means.

a fan in said first end of said first duct for blowing air into said chamber, a flexible boot registering with said first end of said first duct and extending generally downwardly into said chamber for directing the air from said first duct onto an object positioned beneath said boot within said chamber, and a damper selectively and alternatively operable between a first position wherein said damper opens said first opening and closes said second opening so that said second end of said first duct communicates with said first end of said second duct, and a second position wherein said damper opens said second opening and closes said first opening so that said first end of said second duct is closed to said chamber and said second end of said first duct communicates with said chamber, with said second end of said second duct remaining in communication with said chamber.

*10. A test chamber device comprising a generally enclosed chamber, air heating means, air refrigeration means*

*said heating and refrigerating means being alternatively operable, means for* [preventing] *controlling air flow over both said heating and refrigerating means and further operative to prevent air flow over said refrigerating means when said heating means is operating, and single means for circulating air over said heating means and into said chamber when said heating means is operating and for circulating air over said refrigerating means and into said chamber when said refrigerating means is operating.*

*11. A test chamber device as set forth in claim 10 and further comprising a first duct having therein said heating means and communicating with said chamber, and a second duct having therein said refrigerating means and communicating with said chamber, and wherein said single means circulates air through said first duct when said heating means is operating and circulates air through said second duct when said refrigerating means is operating.*

*12. A test chamber device as set forth in claim 11 wherein said second duct is generally vertically oriented and has a lower end, and wherein said device further includes means in said lower end for draining water condensed on said refrigerating means.*

*13. A test chamber device as set forth in claim 11 wherein said first duct includes a first end communicating with said chamber and a second end, wherein said second duct includes a first end and a second end communicating with said chamber, and wherein said device further comprises means for selectively connecting said second end of said first duct to said first end of said second duct when said refrigerating means is operating, and for opening said second end of said first duct to said chamber and closing said first end of said second duct when said heating means is operating.*

*14. A test chamber device as set forth in claim 13 wherein said second end of said first duct has a first opening communicating with said first end of said second duct and a second opening communicating with said chamber, and wherein said means for connecting said second end of said first duct to said first end of said second duct includes a damper selectively and alternatively operable between a first position wherein said damper opens said first opening and closes said second opening, and a second position wherein said damper opens said second opening and closes said first opening, with said second end of said second duct remaining in communication with said chamber.*

*15. A test chamber device as set forth in claim 13 wherein said first end of said first duct communicates with said chamber through a third opening, and wherein said device further comprises a boot registering with said third opening and extending into said chamber for directing the air from said first duct onto an object within said chamber.*

*16. A test chamber device as set forth in claim 11 wherein said single means includes a fan which circulates air through said first duct when said heating means is operating and which circulates air through said second duct when said refrigerating means is operating.*

*17. A test chamber device as set forth in claim 10 wherein said single means includes a fan which circulates air over said heating means when said heating means is operating and which circulates air over said refrigerating means when said refrigerating means is operating.*

*18. A test chamber device comprising a generally enclosed chamber, first duct means having therein heating means and communicating with said chamber, second duct means having therein refrigerating means and communicating with said chamber, said heating and refrigerating means being alternatively operable, and means for preventing air flow over said refrigerating means when said heating means is operating, said means for preventing air flow comprising damper means for controlling air flow through both of said first and second duct means, said damper means being selectively operable in a first mode for directing air flow through said second duct means and over said refrigerating means, and said damper means being selectively operable in a second mode for directing air flow through said first duct means and over said heating means.*

*19. A test chamber device as set forth in claim 18 wherein said first duct means includes a first end communicating with said chamber, and a second end, wherein said second duct means includes a first end, and a second end communicating with said chamber, wherein said damper means is operable in said first mode for connecting said second end of said first duct to said first end of said second duct, and wherein said damper means is operable in said second mode for opening said second end of said first duct to said chamber and closing said first end of said second duct.*

*20. A test chamber device as set forth in claim 19 wherein said second end of said first duct means has a first opening communicating with said first end of said second duct means and a second opening communicating with said chamber, and wherein said damper means is operable between first and second positions corresponding to said first and second modes, respectively, said damper means operating in said first position to open said first opening and close said second opening, and said damper means operating in said second position to open said second opening and close said first opening, with said second end of said second duct means remaining communication with said chamber.*

*21. A test chamber device as set forth in claim 19 wherein said first end of said first duct communicates with said chamber through a third opening, and wherein said device further comprise a boot registering with said third opening and extending into said chamber for directing the air from said first duct onto an object within said chamber.*

*22. A test chamber device as set forth in claim 18 wherein said second duct means is generally vertically oriented and has a lower end, and wherein said device further includes means in said lower end for draining water condensed on said refrigerating means.*

*23. A test chamber device as set forth in claim 18 and further comprising single means for circulating air through said second duct means when said damper means is in said first mode and for circulating air through said first duct means when said damper means is in said second mode.*

*24. A test chamber device as set forth in claim 23 wherein said single means includes a fan which circulates air through said second cut means when said damper means is in said first mode and which circulates air through said first duct means when said damper means is in said second mode.*

*25. A test chamber device as set forth in claim 18 and further comprising a housing enclosing said chamber, said first and second duct means and said damper means.*

*26. A test chamber comprising, in combination,*

*means defining an enclosed chamber,*

*heating means,*

*refrigerating means,*

*said heating means and refrigerating means being alternatively operable,*

*duct means associated with each of said heating and refrigeration means and with said chamber so that air can be circulated through said duct means, over said heating and refrigerating means and through said chamber,*

*means for circulating air through said duct means, over said heating and refrigerating means and to and from said chamber, and*

*damper means associated with said duct means for controlling air flow over both said heating and refrigerating means, said damper means being operative to provide air flow over said refrigerating means and to and from said chamber, and said same damper means being further operative to provide air flow over said heating means while simultaneously interrupting said air flow over said refrigerating means.*

*27. The test chamber of claim 26 wherein said circulating means comprises a single fan.*

*28. The test chamber of claim 26 and further comprising a housing enclosing said chamber, said heating and refrigerating means, said duct means and said damper means.*

* * * * *